March 30, 1954
B. R. BANUS
2,673,958
BATTERY VOLTMETER
Filed Oct. 19, 1949
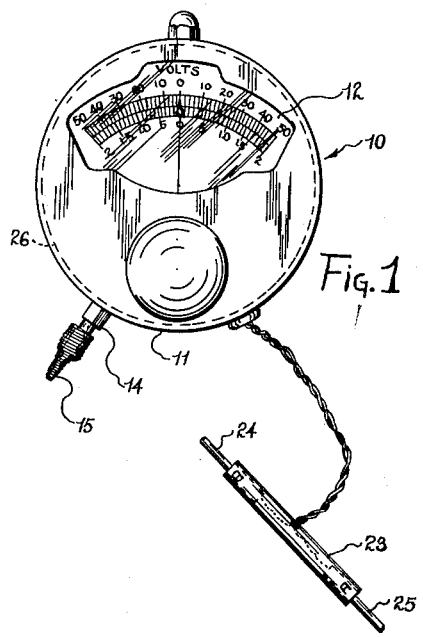
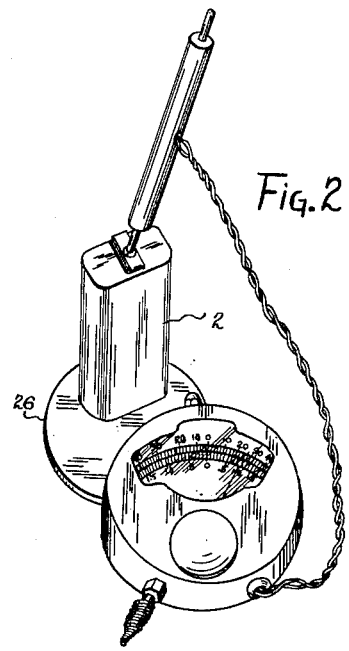
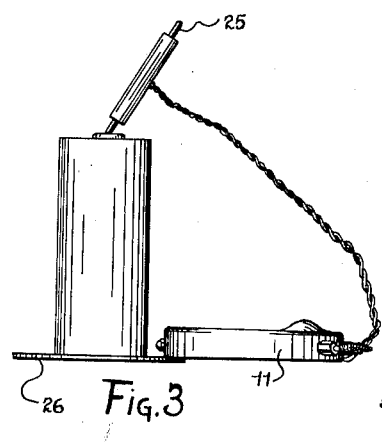
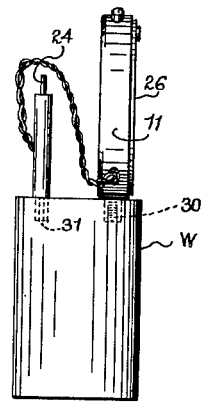
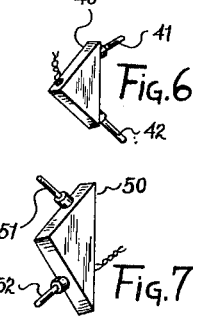
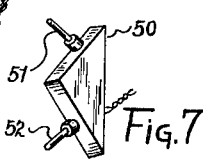
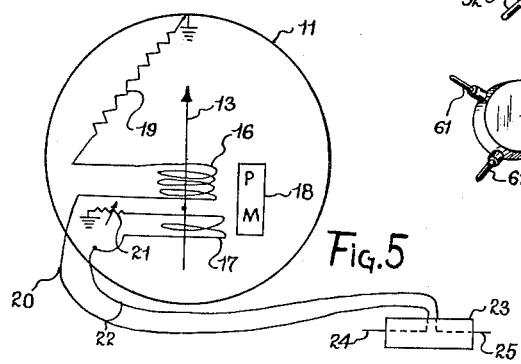
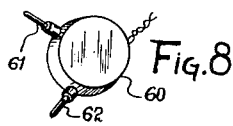
INVENTOR.
BERNARD R. BANUS
BY
*West & Oldham*
ATTORNEYS Patented Mar. 30, 1954

2,673,958

UNITED STATES PATENT OFFICE 2,673,958

BATTERY VOLTMETER

Bernard R. Banus, Cleveland, Ohio, assignor to The Sterling Mfg. Company, Cleveland, Ohio, a corporation of Ohio Application October 19, 1949, Serial No. 122,186

2 Claims. (Cl. 324—149)

This invention relates to battery voltmeters, especially to a voltmeter that is particularly suited for testing either "A" or "B" batteries such as are used in hearing aid devices, or the like.

At the present time there are a great number of manufacturers of hearing aid devices and these hearing aid devices use batteries therein which are of many different types, sizes, and shapes. Thus in some instances a small cylindrical battery may be used which has a contact formed on the top and another one on the bottom thereof, or the entire case may comprise one of the battery contacts. Also, a relatively long cylindrical battery is in use today, which battery may have contacts or terminals provided at the bottom or sides of cylindrical recesses formed in one end of the battery. Many batteries also are of conventional elongate shape and are substantially rectangular in cross section. Thus heretofore it has been very difficult to test these great varieties of sizes and shapes of batteries by any one battery voltmeter device. An additional problem relating to the testing of batteries is that in many instances the person attempting to test the battery may be quite unskilled in electrical matters and might connect the battery to the voltmeter in such a way that no reading would be obtained on the voltmeter even though the battery was good, because the person had inadvertently connected the battery to the voltmeter with reverse polarity to that required by the voltmeter for producing a reading thereon.

Due to the different voltage ranges of "A" and "B" batteries, it heretofore has been even more complicated for the layman when endeavoring to test the voltage of a battery.

The general object of the present invention is to avoid and overcome the foregoing and other difficulties with and disadvantages of previous types of battery voltmeters, and to provide a novel voltmeter which is characterized by its ability to test substantially any dry battery and to give a voltage reading thereof.

Another object of the present invention is to provide a battery voltmeter which is adapted to read the voltage of a battery regardless of the polarity of connection of a battery to the voltmeter.

A further object of the invention is to provide a battery voltmeter which has a plurality of different and movable contacts thereon to facilitate engagement of a pair of contacts with a dry battery.

A further object of the invention is to provide a battery voltmeter wherein the case of the voltmeter is electroconductive and wherein the case has a plurality of flexible or movable contacts provided thereon for engagement with one battery terminal.

Another object of the invention is to provide a battery voltmeter with one contact that is connected to the voltmeter by a flexible lead so that such contact can be readily moved when the battery terminal is remote from the voltmeter.

The foregoing and further objects and advantages of the invention will be made more apparent as the specification proceeds.

Reference now should be had to the accompanying drawings wherein one best known embodiment of the invention is illustrated and wherein:

Fig. 1 is an elevation of a battery voltmeter embodying the principles of the invention;

Fig. 2 is a perspective view of the voltmeter of Fig. 1 showing it engaged with a battery for testing the voltage thereof;

Fig. 3 is a side elevation of the apparatus shown in Fig. 2;

Fig. 4 is an elevation of the battery tester of Fig. 1 showing it engaged with a different type of a battery;

Fig. 5 is a diagrammatic wiring diagram of the voltmeter of Fig. 1; and

Figs. 6, 7 and 8 are perspective views of modifications of the contact member provided at the end of the flexible lead of the voltmeter.

If referring to the accompanying drawings and in the following specification, corresponding numerals will be used to identify corresponding parts to simplify comparison between the drawings and the specification.

With reference to the details shown in the drawings, a battery voltmeter 10 is shown and this voltmeter primarily comprises a case 11 in which the operative portions of the voltmeter are positioned. Usually this case 11 is made from metallic material so that in all events the case is electroconductive. The case 11 has a dial 12 provided in a cutout portion of the case and usually some kind of a transparent cover is provided over the dial 12. It will be noted that the dial 12 has two voltage scales provided thereon and that the dial is provided with a center zero position so that voltage may be read on the dial 12 regardless of the polarity of the applied voltage. A pointer 13 is shown positioned in association with the dial 12 for indicating a voltage reading.

As an important element of the present invention, the voltmeter 10 has a contact foot 14 that is usually rigidly secured to the case 11 and extends substantially radially therefrom. This contact foot 14 may be provided with a flexible tip element 15 which is in telescope or other suitable engagement with the contact foot 14 and protrudes therefrom.

Usually the voltmeter 10 is provided with two operating coils 16 and 17. These coils 16 and 17 are provided for passing the voltage of the batteries to be tested therethrough and for in turn controlling the position of the pointer 13 on the dial 12. The voltmeter is of a conventional construction in the electrical construction thereof. The voltmeter 10 is a regular polarized vane meter. The polarity of the meter is obtained by use of a permanent magnet indicated at 18 which is located outside of the field set up by electrical current passing through either of the coils 16 or 17. It will be noted that the coil 16 connects through a relatively high resistance 19 to the case 11 which functions as a common ground for both the coils 16 and 17. The other terminal of the coil 16 connects to a flexible lead 20 which is insulated from the case 11 and which extends a distance of several inches therefrom. The coil 17 connects to a variable resistance 21 to the case 11 whereas the opposite terminal of the coil 17 connects to a lead 22 which usually is flexible and which extends a distance of several inches from the case 11. The lead 22 is insulated from the case 11 like the lead 20.

As an important feature of the invention, a contact control member 23 is provided and is shown as comprising a relatively thin cylindrical member which is provided at its ends with terminals 24 and 25 which extend substantially axially therefrom. Fig. 5 indicates that the lead 20 connects to the terminal 24 whereas lead 22 connects to the terminal 25. The coil 17 is the "A" coil of the voltmeter whereas the coil 16 is the "B" coil of the voltmeter so that the contact 25 thus is for the "A" battery whereas the contact or terminal 24 is provided for testing "B" batteries by the voltmeter of the invention.

Another particularly desirable feature of the present invention is that a movable contact element is provided in pivotal relationship to the case 11. Thus a flat disk 26, usually metallic, is pivotally secured to the back of the case 11 and is in good electrical contact therewith. Usually the disk 26 is formed from metal and it is adapted to be swung into register with the case 11, as indicated in Fig. 1, or else the disk 26 may be extended appreciably from the case 11 to facilitate engagement of a battery to be tested between two terminal portions of the voltmeter 10.

Fig. 2 of the invention best illustrates how a battery Z may be tested by the voltmeter 10. Thus the disk 26 is swung out to its extended position with relation to the case 11 and at such times the contact control member can readily be brought into engagement with the top terminal of the battery Z so as to bring the terminal 24 into engagement with a terminal of the battery so that the battery is effectively connected to the voltmeter 10 and the voltage of same can easily be read by use of the dial 12 and pointer 13, since the disk 26 touches the other battery terminal.

Fig. 4 shows how a different type of a battery W may be tested by the voltmeter 10 so that in this instance the resilient tip 15 is engaged with one recess terminal 30 provided for the battery W whereas another recessed terminal 31 of the battery is engaged with the terminal 24 of the voltmeter 10. By provision of the one terminal for the voltmeter 10 right on the case 11 or in association therewith, and by providing a freely movable second terminal connection or contact for the voltmeter 10, the voltmeter is readily and easily brought into engagement with both terminals of any battery to be tested by the voltmeter of the invention.

Usually the voltmeter 10 is provided for testing both "A" and "B" batteries although in some instances it might be desirable to make the voltmeter with only one operating coil and it then would be only adapted for testing batteries having a more limited voltage range, or else less accurate results would be obtained by the voltmeter of the invention.

In some instances it may be desired to vary the specific shape of the contact or terminal control member of the voltmeter 10 and Figs. 6, 7 and 8 show modifications of this element of the invention. Thus in Fig. 6 is shown a substantially rigid member 40 which has a pair of contacts 41 and 42 extending therefrom and a pair of leads connect to the member 40 for individual engagement with the contacts 41 and 42 for connecting either operating coil of a voltmeter with one terminal of a battery the voltage of which is to be tested. Fig. 7 likewise shows a rigid member 50 which has two contacts 51 and 52 extending from opposite sides of the triangular edge portion provided on the member 50. Fig. 8 indicates that a substantially annular member 60 may be used and have a pair of terminals 61 and 62 extending substantially radially from different circumferential portions thereof. In each instance, the contacts or terminals provided on the contact control member would be integrally connected to the different operating coils of the voltmeter of the invention.

From the foregoing, it should be seen that a readily adjustable type of a voltmeter device has been provided, which device is adapted to be used to register or indicate the voltage of any known type of dry battery such as is used in hearing aids, or the like. The voltmeter is adapted to indicate the voltage of the device regardless of the polarity of connection of the battery to the voltmeter and the only requirement by the user of the device is that he connect the proper terminal such as either terminal 24 or 25 to the battery to be tested. These terminals will be marked as the "A" or "B" terminal so that the tester, even though a layman, will readily see that he should engage the "A" terminal with an "A" battery and a "B" terminal with a "B" battery. The remaining battery terminal is engaged with the case 11 or a terminal device connected thereto to complete the test circuit. The case 11 may be made conductive, or only local areas may be conductive, as desired. Also, the disk 26 may be directly connected to the electrical circuit and the case need not be conductive in such instance.

Having thus described my invention, what I claim is:

1. A voltmeter comprising a flat cylindrical electroconductive case, voltage indicating means in said case, a pair of operating coils in said case for said means, a lead connecting one end of each of said coils to said case, a pair of second leads one of which extends from each of said coils at the opposite end thereof to a point remote from said case, a rigid member having a plurality of spaced contacts thereon, each one of said second leads connecting to only one of said contacts, a flat contact disk and conductive means eccentrically securing said contact disk to the back of said case for pivotal movement to and from registration therewith and for movement only in the plane of said case whereby said disk can be swung out from said case and said case can be laid on its back on a support and one battery terminal can be brought into contact with said disk by resting a battery on said disk and one contact on said rigid member can be brought into engagement with the other terminal of the battery to complete a test circuit.

2. A voltmeter comprising a flat electroconductive case, voltage indicating means, an operating coil for said means, a lead connecting one end of said coil to said case, a second lead extending from said coil at the opposite end thereof to a point remote from said case, a contact member connected to said second lead, a flat contact disk and conductive means eccentrically securing said contact disk to the back of said case for pivotal movement to and from registration therewith and for movement only in a plane defined by said case whereby said contact disk can be swung out from said case and said case can be laid on its back on a support and a battery can be supported on said contact disk with one terminal engaging said contact disk and a test circuit completed through the battery by bringing said contact member into engagement with another terminal of the battery.

BERNARD R. BANUS.

References Cited in the file of this patent

UNITED STATES PATENTS

| Number | Name | Date |
|---|---|---|
| 460,650 | McIntosh | Oct. 6, 1891 |
| 532,561 | Hoyt | Jan. 15, 1895 |
| 1,072,531 | Triplett | Sept. 9, 1913 |
| 1,297,416 | Summerton | Mar. 18, 1919 |

FOREIGN PATENTS

| Number | Country | Date |
|---|---|---|
| 143,512 | Germany | Aug. 15, 1903 |
| 21,700 of 1903 | Great Britain | Oct. 8, 1903 |
| 153,584 | Germany | July 27, 1904 |
| 5,261 | Great Britain | Apr. 7, 1915 |
| 160,332 | Great Britain | Mar. 24, 1921 |
| 275,399 | Great Britain | Aug. 11, 1927 |
| 322,558 | Great Britain | Dec. 12, 1929 |